United States Patent
Hara et al.

(10) Patent No.: US 11,530,923 B2
(45) Date of Patent: Dec. 20, 2022

(54) SYSTEM, APPARATUS, STORAGE MEDIUM, AND METHOD FOR PROVIDING A ROUTE AND AID FOR PEOPLE IN NEED OF ASSISTANCE

(71) Applicant: TOYOTA JIDOSHA KABUSHIKI KAISHA, Toyota (JP)

(72) Inventors: Yusuke Hara, Musashino (JP); Shuhei Aketa, Koto-ku (JP); Toru Yanagida, Nagoya (JP); Shin Sakurada, Toyota (JP); Tae Sugimura, Miyoshi (JP); Yasutaka Ujihara, Meguro-ku (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 36 days.

(21) Appl. No.: 16/933,708

(22) Filed: Jul. 20, 2020

(65) Prior Publication Data

US 2021/0018320 A1   Jan. 21, 2021

(30) Foreign Application Priority Data

Jul. 19, 2019 (JP) .............................. JP2019-133808

(51) Int. Cl.
  *G01C 21/20*  (2006.01)
(52) U.S. Cl.
  CPC .................................. *G01C 21/206* (2013.01)
(58) Field of Classification Search
  CPC .................................................. G01C 21/206
  See application file for complete search history.

(56) References Cited

U.S. PATENT DOCUMENTS

| 2018/0018718 A1* | 1/2018 | Childress ................ H04L 67/10 |
| 2019/0279496 A1* | 9/2019 | Kayhani ................ G06Q 10/10 |
| 2020/0025574 A1* | 1/2020 | Kasperski, III ...... G01C 21/206 |

FOREIGN PATENT DOCUMENTS

| CN | 105726234 A | | 7/2016 |
| CN | 105761339 A | | 7/2016 |
| JP | 2002190097 A | * | 7/2002 |
| JP | 2005056208 A | | 3/2005 |
| JP | 2007041005 A | | 2/2007 |
| JP | 2011175595 A | | 9/2011 |
| JP | 2016038623 A | * | 3/2016 |
| JP | 6058385 B2 | | 1/2017 |

OTHER PUBLICATIONS

Translation of JP-2002190097-A (Year: 2002).*
Translation of JP-2016038623-A (Year: 2016).*

* cited by examiner

*Primary Examiner* — Michael D Lang
(74) *Attorney, Agent, or Firm* — Oliff PLC

(57) ABSTRACT

An information processing apparatus for providing aid to people in need of assistance outdoors. The information processing apparatus includes a controller. When a request for a search for a route is received, the controller generates, using a link and a node at which travel by a wheelchair is possible, a section to be included in the route between two locations and that is to be traveled by the wheelchair.

20 Claims, 13 Drawing Sheets

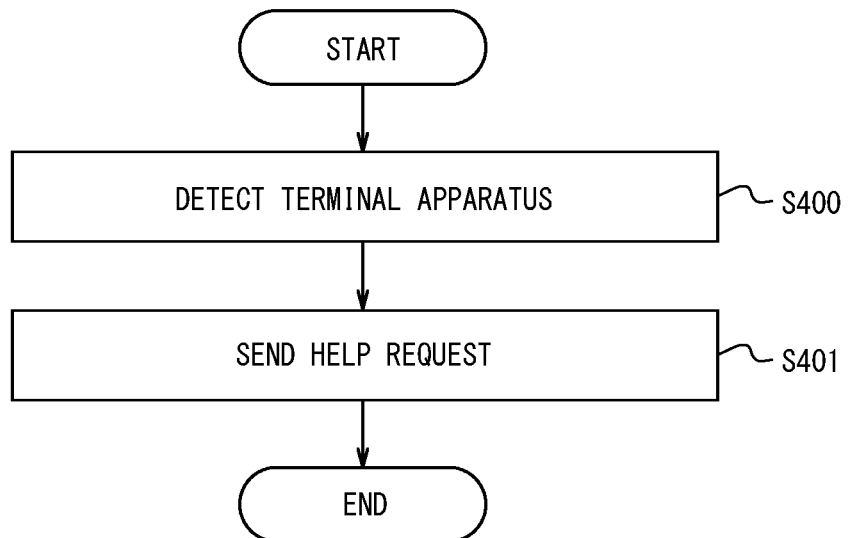
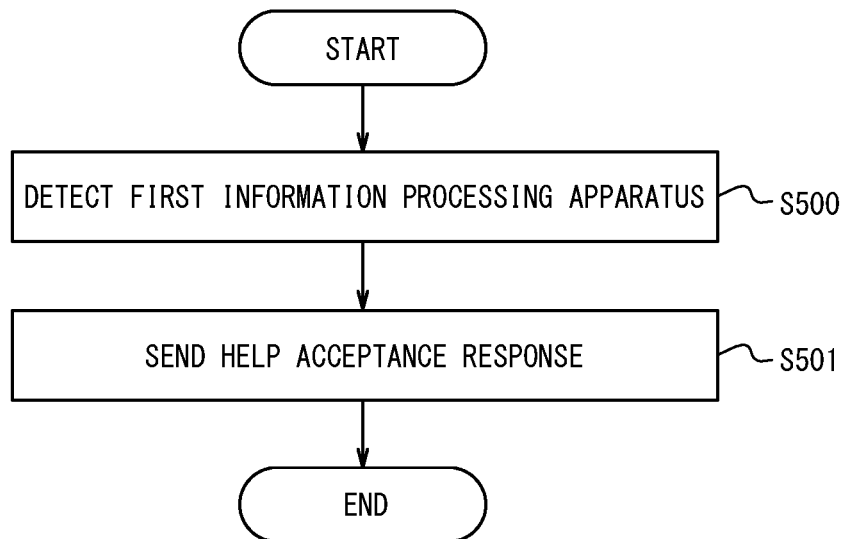

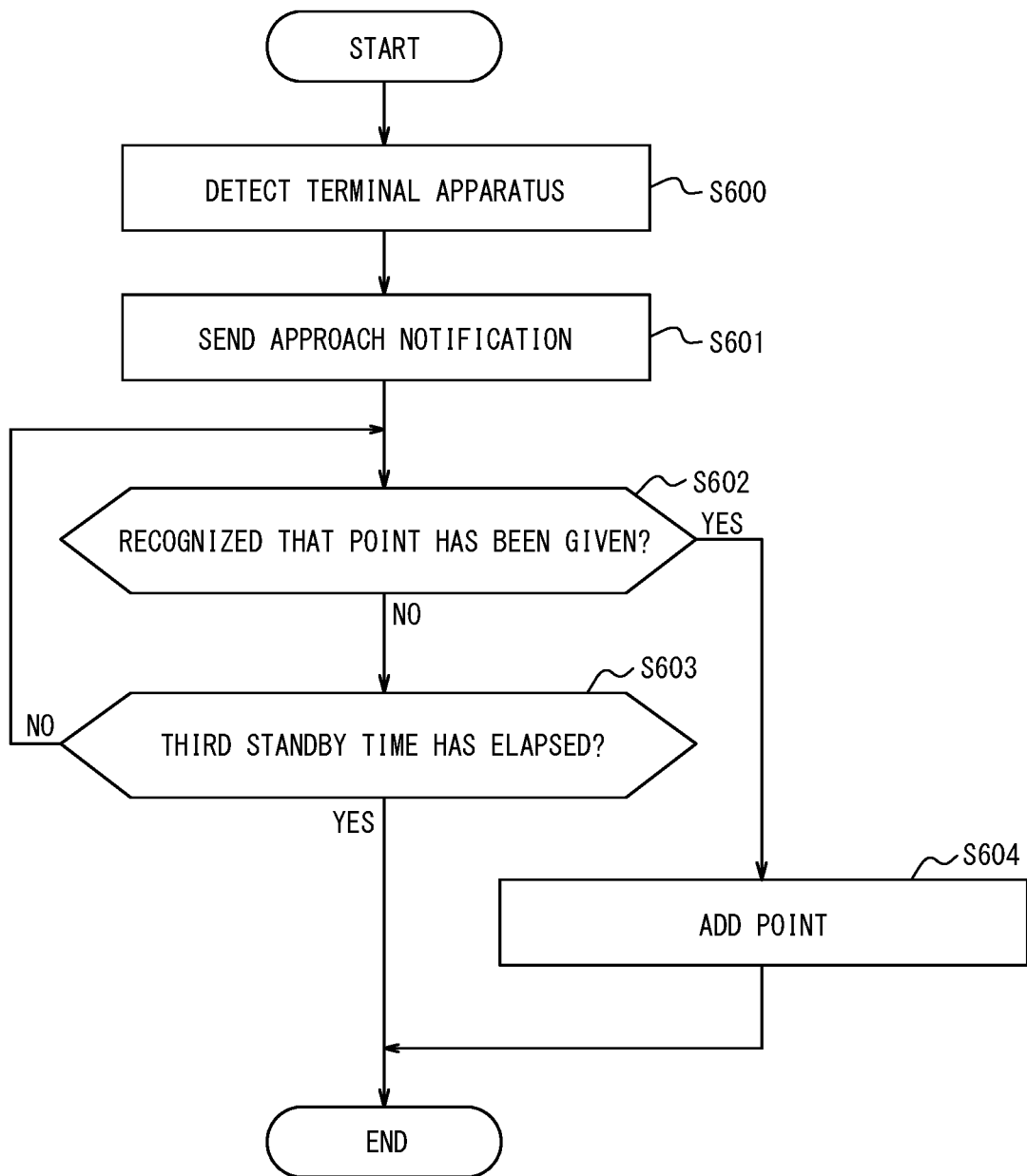

SYSTEM, APPARATUS, STORAGE MEDIUM, AND METHOD FOR PROVIDING A ROUTE AND AID FOR PEOPLE IN NEED OF ASSISTANCE

CROSS-REFERENCE TO RELATED APPLICATION

The present application claims priority to Japanese Patent Application No. 2019-133808 filed on Jul. 19, 2019, the entire disclosure of which is incorporated herein by reference.

TECHNICAL FIELD

The present disclosure relates to an information processing apparatus, an information processing system, a storage medium, and an information processing method.

BACKGROUND

There has been a demand for aid for people in need of assistance. For the purpose of helping a person in need of assistance stand up, a self-propelled assistant robot that moves indoors to the location of the person in need of assistance while circumventing obstacles has been developed (refer to PTL 1).

CITATION LIST

Patent Literature

[PTL 1] JP6058385B

SUMMARY

Aid for people in need of assistance is desired not only indoors but also outdoors.

In consideration of the above background, an object of the present disclosure is to provide aid for people in need of assistance outdoors.

An information processing apparatus according to an embodiment of the present disclosure includes a controller that, when a request for a search for a route between two locations is recognized, generates, using a link and a node at which travel by a wheelchair is possible, a section to be included in the route between the two locations and that is to be traveled by the wheelchair.

An information processing system according to an embodiment of the present disclosure includes an information processing apparatus and an announcement apparatus. The information processing apparatus includes a controller that, when a request for a search for a route between two locations is recognized, generates, using a link and a node at which travel by a wheelchair is possible, a section to be included in the route between the two locations and that is to be traveled by the wheelchair. The announcement apparatus communicates with the information processing apparatus. The controller informs the announcement apparatus of an expected arrival time for a location at which the announcement apparatus exists based on a location of a requestor of the search for the route and a time at which the requestor is at the location, the announcement apparatus being situated in the section of the route to be traveled by the wheelchair.

A non-transitory computer-readable storage medium according to an embodiment of the present disclosure stores a program. The program, when executed, causes an information processing apparatus to execute a process including recognizing a request for a search for a route between two locations, and when the request for the search for the route is recognized, generating, using at least a link and a node at which travel by a wheelchair is possible, a section to be included in the route between the two locations and that is to be traveled by the wheelchair.

An information processing method implemented by an information processing apparatus according to an embodiment of the present disclosure includes recognizing a request for a search for a route between two locations and, when the request for the search for the route is recognized, generating, using a link and a node at which travel by a wheelchair is possible, a section to be included in the route between the two locations and that is to be traveled by the wheelchair.

The information processing apparatus, the information processing system, the storage medium, and the information processing method according to an embodiment of the present disclosure can provide aid for people in need of assistance outdoors.

BRIEF DESCRIPTION OF THE DRAWINGS

In the accompanying drawings:

FIG. 10 is a flowchart illustrating help request processing performed by a controller of the second information processing apparatus in FIG. 4;

FIG. 11 is a flowchart illustrating help-request acceptance processing performed by the controller of the second information processing apparatus in FIG. 4;

FIG. 12 is a flowchart illustrating approach notification processing performed by the controller of the second information processing apparatus in FIG. 4;

DETAILED DESCRIPTION

Hereinafter, an embodiment of the present disclosure will be described with reference to the drawings.

Figure 1:
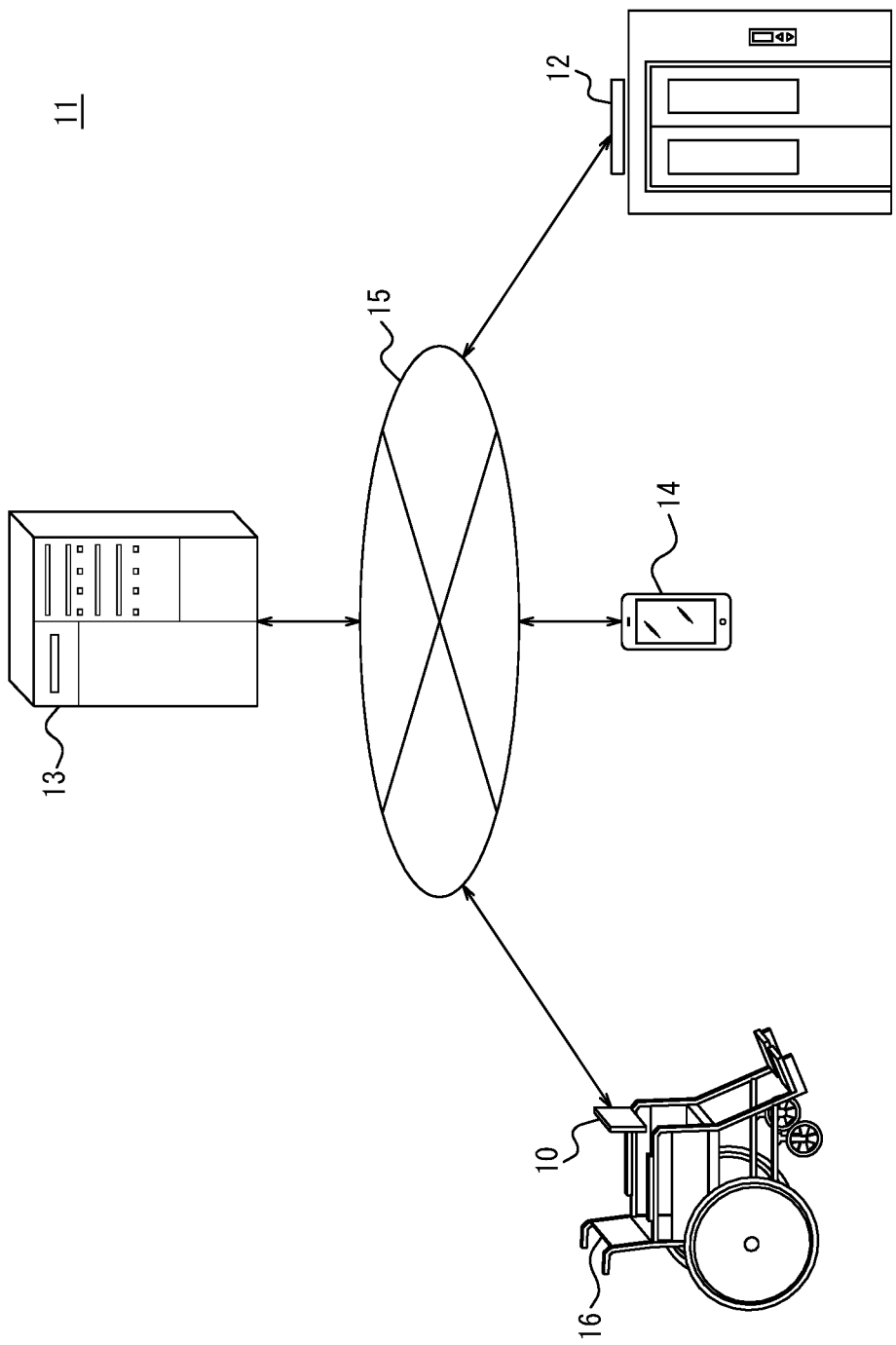
FIG. 1 is a configuration diagram illustrating an overall configuration of an information processing system including a first information processing apparatus according to an embodiment of the present disclosure.

An information processing system 11 including a first information processing apparatus 10 according to an embodiment of the present disclosure will be outlined with reference to FIG. 1. The information processing system 11 includes the first information processing apparatus 10, an announcement apparatus 12, a second information processing apparatus 13, and a terminal apparatus 14. The first information processing apparatus 10 is, for example, an electronic device specific to the information processing system 11, but the first information processing apparatus 10 is not limited to this example and may be a general electronic device such as a smartphone or a tablet computer. The announcement apparatus 12 is, for example, a device that has a communication function and that outputs information in the form of sounds or images, such as a speaker or a display. The announcement apparatus 12 is installed in a facility such as an elevator of which people in need of assistance are given priority use. The second information processing apparatus 13 includes one server apparatus or a plurality of server apparatuses that are capable of communicating with each other. The terminal apparatus 14 is, for example, a general portable electronic device such as a smartphone or a tablet computer, but the terminal apparatus 14 is not limited to this example and may be an electronic device dedicated to the information processing system 11. While FIG. 1 illustrates one first information processing apparatus 10, one announcement apparatus 12, and one terminal apparatus 14 for ease of description, the information processing system 11 only has to include at least one first information processing apparatus 10, at least one announcement apparatus 12, and at least one terminal apparatus 14. The first information processing apparatus 10, the announcement apparatus 12, the second information processing apparatus 13, and the terminal apparatus 14 are communicably connected to a network 15 which includes, for example, a mobile communication network and the Internet.

The outline of the information processing system 11 according to the present embodiment is hereinafter further explained. The first information processing apparatus 10 is attached to a wheelchair 16 in a detachable manner. When a search for a route between two locations is requested, the first information processing apparatus 10 generates a route including a section in which travel by the wheelchair 16 is possible and notifies a person in need of assistance of the route. The wheelchair 16 is, for example, a manual or electric-powered wheelchair for people having difficulty in walking or a mobility scooter for elderly people, which are regarded as pedestrians under the Japanese Road Traffic Act. In a case in which the announcement apparatus 12 is on a presented route, the first information processing apparatus 10 sends to the announcement apparatus 12 an expected arrival time for the location of the announcement apparatus 12. After the expected arrival time for the location has been sent to the announcement apparatus 12, the announcement apparatus 12 starts, at or before the expected arrival time for the location of the announcement apparatus 12, announcing to the area around the announcement apparatus 12 that the wheelchair 16 will arrive, thereby encouraging priority use of a facility equipped with the announcement apparatus 12 by the person in need of assistance. In a case in which a specific type of facility is on a presented route, the first information processing apparatus 10 sends a help request for an expected arrival time for the specific type of facility to the terminal apparatus 14 via, for example, the second information processing apparatus 13. In a case in which the specific type of facility is a first facility, the first information processing apparatus 10 sends to the terminal apparatus 14 a first help request that is a request for help at the first facility. When, for the first help request, it is recognized that assistance is available at a link and a node which pass through the first facility, the first information processing apparatus 10 allows use of the link and the node in generation of a section to be traveled by the wheelchair 16. After the terminal apparatus 14 receives a help request, the terminal apparatus 14 notifies an owner of the terminal apparatus 14 of the help request and an expected arrival time for the corresponding facility. When an input indicating whether assistance can be provided in response to the help request is detected, the terminal apparatus 14 notifies, via the second information processing apparatus 13, the first information processing apparatus 10 of the indication of whether assistance can be provided. After the first information processing apparatus 10 sends the help request, upon reaching an area close to the specific type of facility, the first information processing apparatus 10 sends, via, for example, the second information processing apparatus 13, an approach notification to at least one of the terminal apparatuses 14 to which the help request has been sent. When the terminal apparatus 14 receives the approach notification, the terminal apparatus 14 notifies its owner that the wheelchair 16 is situated close to the specific type of facility. When the first information processing apparatus 10 detects an input by a person in need of assistance who has received the assistance that indicates that the assistance has been performed, the first information processing apparatus 10 sends a point to the helper via the second information processing apparatus 13. Helpers who acquire points may receive rewards in accordance with the points.

Next, the constituents of the information processing system 11 are described in detail.

Figure 2:
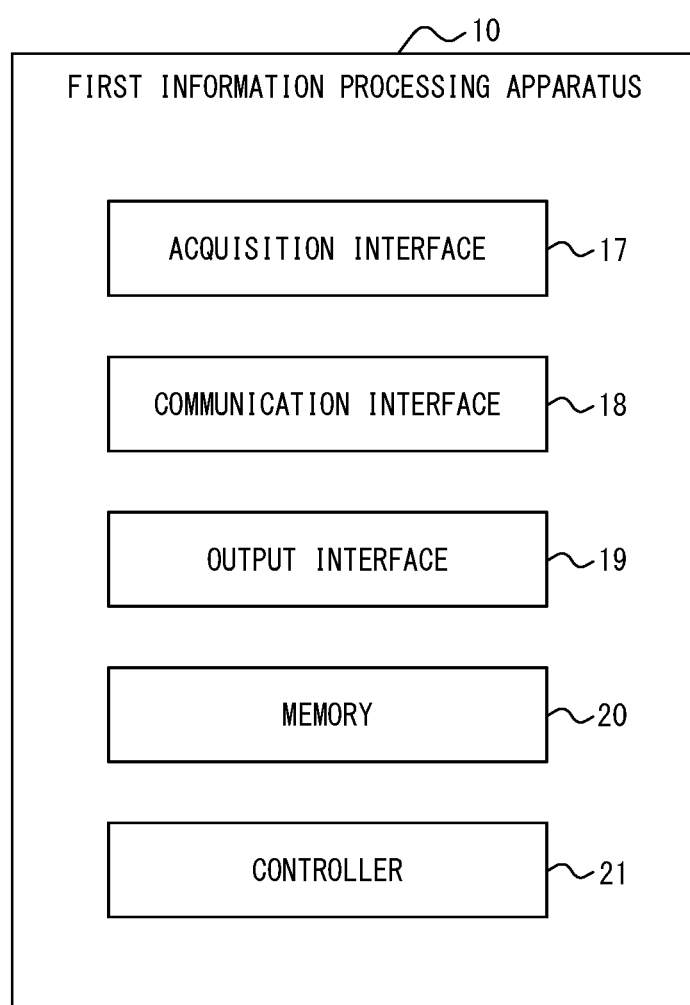
FIG. 2 is a functional block diagram schematically illustrating a configuration of the first information processing apparatus in FIG. 1.

The first information processing apparatus 10 is, for example, a navigation apparatus. As illustrated in FIG. 2, the first information processing apparatus 10 includes an acquisition interface 17, a communication interface 18, an output interface 19, a memory 20, and a controller 21.

The acquisition interface 17 acquires at least one of instructions and information for the first information processing apparatus 10. The acquisition interface 17 includes, for example, a communication module that establishes a connection with the network 15, and the acquisition interface 17 can acquire various instructions and various kinds of information from external devices such as the second information processing apparatus 13 and the terminal apparatus 14 through the network 15. The acquisition interface 17 can acquire, for example, information received by a Global Positioning System (GPS) receiver or the like installed in the first information processing apparatus 10. The acquisition interface 17 can acquire, for example, a current time from a timer installed in the first information processing apparatus 10.

The acquisition interface 17 can acquire, for example, information related to a user input detected by an input interface installed in the first information processing apparatus 10. For example, the input interface includes physical keys, capacitive keys, a touch screen provided in combination with a display of the output interface 19, or a microphone that accepts sound input. The acquisition interface 17 can acquire a user input for a request for a search for a route between two locations. Two locations targeted for search may include a location such as a retail establishment that accepts entry of a person in need of assistance who uses the wheelchair 16. The two locations targeted for search may also include a particular location inside the facility that accepts entry.

The communication interface 18 includes, for example, a communication module that establishes connection with the network 15. The communication interface 18 sends, for example, a help request, an approach notification, various kinds of information described later, and instructions to external devices such as the terminal apparatus 14 and the second information processing apparatus 13. It should be noted that the communication interface 18 may be provided in combination with the acquisition interface 17.

The output interface 19 includes at least one interface that outputs information to notify users. For example, the output interface 19 is, but not limited to, a display that outputs information as images or a speaker that outputs information as sound.

The memory 20 is, for example, but not limited to, a semiconductor memory, a magnetic memory, an optical memory, or the like. The memory 20 may function as, for example, a primary storage, an auxiliary storage, or a cache memory.

The memory 20 stores any information that is used for an operation of the first information processing apparatus 10. The memory 20 may store, for example, a system program and an application program. The memory 20 may store many links and nodes constituting various routes. The links and nodes are constituent elements of a path network. A link is a path connecting two different nodes. A node is a point such as an intersection or a branch point, or a point at which the character of a corresponding path changes. The memory 20 may store accessibility conditions for the wheelchair 16 in association with individual links and nodes. The memory 20 may store accessibility conditions for respective types of vehicle, other than the wheelchair 16, such as a train or a bus, in association with individual links and nodes. The memory 20 may store a location of a specific type of facility, as described later, in association with, for example, a link or a node. The memory 20 may store a location of the announcement apparatus 12 and identification information for the announcement apparatus 12 in association with, for example, a link or a node. The identification information for the announcement apparatus 12 is information that can be used to uniquely identify the announcement apparatus 12 in the information processing system 11. The memory 20 may store identification information for the first information processing apparatus 10. The identification information for the first information processing apparatus 10 is information that can be used to uniquely identify the first information processing apparatus 10 in the information processing system 11. The information stored in the memory 20 may be updated using, for example, information acquired from the network 15 via the acquisition interface 17.

The controller 21 includes at least one processor. In the present embodiment, a "processor" may be, but is not limited to, a general processor or a processor dedicated to a particular processing operation. The controller 21 controls the entire operation of the first information processing apparatus 10.

When the controller 21 recognizes that the acquisition interface 17 has acquired a user input which requests a search for a route between two locations, the controller 21 generates a route. The controller 21 generates a route which includes at least a part which is to be traveled by the wheelchair 16. For example, the controller 21 generates a route which is entirely traveled by the wheelchair 16 or a route which partially traveled by a vehicle other than the wheelchair 16 and partially traveled by the wheelchair 16.

The controller 21 uses links and nodes stored in the memory 20 to generates the route. When generating the route, the controller 21 generates, using links and nodes at which travel by the wheelchair 16 is possible, a section that is included in a route between the two locations and that is to be traveled by the wheelchair 16. The controller 21 reads from the memory 20, for example, links and nodes that are between the two locations and that are to be travelled by a vehicle other than the wheelchair 16. The controller 21 reads from the memory 20, for example, links and nodes that are connected to the read links and nodes and at which travel by the wheelchair 16 is possible. The controller 21 generates a route using, for example, links and nodes to be travelled by a vehicle other than the wheelchair 16 and links and nodes that are connected to the links and nodes to be travelled by a vehicle other than the wheelchair 16 and at which travel by the wheelchair 16 is possible.

In a case in which a section to be traveled by the wheelchair 16 in the generated route includes a specific type of facility, the controller 21 calculates an expected arrival time for the facility. The specific type of facility may include a first facility and a second facility. The first facility is a facility at which assistance is necessary for travel by the wheelchair 16, such as a very steep sloping road or a platform at which passengers get on and off a vehicle or a train. The second facility is a facility at which assistance is desirable for travel by the wheelchair 16, such as a step, a sloping road, or a slope.

The controller 21 uses a location of a person who requests the search for a route (hereinafter terms the "requestor"), a time at which the requestor is situated at the location, and a location of the specific type of facility to calculate the expected arrival time for the specific type of facility. The controller 21 may regard, for example, a current location of the first information processing apparatus 10 and a current time as the location of the requestor of the search for a route and the time at which the requestor is situated at the location. After calculating an expected arrival time for the specific type of facility, the controller 21 generates a help request including the expected arrival time for the specific type of facility and identification information for the first information processing apparatus 10. The help request is a request submitted by a person in need of assistance as an occupant of the wheelchair 16, that is, a requestor of a search for the route is requesting travel assistance at a specific type of facility at a future time.

In a case in which the specific type of facility is the first facility, the controller 21 sends, via the communication interface 18 and before a route is fixed, a request for help at the first facility as information for first help request to the terminal apparatus 14 that is scheduled to be situated in an area close to the first facility at the expected arrival time for the first facility. The area close to the first facility is within a distance range in which it is assumed that a helper can move to provide assistance; and specifically, a range with a radius of 100 m may be determined as the area close to the first facility. The first help request may be sent to a plurality of the terminal apparatuses 14.

The controller 21 may send the first help request to the terminal apparatus 14 directly or via the second information processing apparatus 13. In a configuration in which the first help request is sent directly to the terminal apparatus 14, while the controller 21 is communicating with many terminal apparatuses 14, the controller 21 searches for at least one terminal apparatus 14 which will be situated in an area close to the first facility at an expected arrival time for the first facility and sends the first help request to the found terminal apparatus 14. In a configuration in which the first help request is sent indirectly to the terminal apparatus 14 via the second information processing apparatus 13, the controller 21 sends the first help request to the second information processing apparatus 13.

After sending the first help request, the controller 21, when the acquisition interface 17 acquires assistance availability information indicating that assistance is available a link and a node which pass through the first facility in response to the first help request, the controller 21 recognizes that assistance is available at the link and the node. The controller 21 may, for example, acquire, as the assistance availability information, a help acceptance response that is sent in response to the first help request by the terminal apparatus 14, which will be described later. The controller 21 may, for example, acquire as the assistance availability information, a notification that the first help request has been sent by the second information processing apparatus 13 to a number of terminal apparatuses 14 which exceeds a threshold. For example, in search for a terminal apparatus 14 which will be situated in an area close to the first facility at an expected arrival time for the first facility, the controller 21 may acquire identification information regarding the found terminal apparatuses 14 as the assistance availability information. For example, in searching for a terminal apparatus 14 which will be situated in an area close to the first facility at an expected arrival time for the first facility, when the acquired identification information, that is, the number of the terminal apparatuses 14 exceeds a threshold, the controller 21 recognizes that assistance is available.

The controller 21, upon recognizing that assistance is available, allows use of the link and the node in generation of a route. Conversely, upon recognizing that assistance is unavailable, the controller 21 generates a route without using the link and the node. When the assistance availability information has not been acquired by the time a first standby time has elapsed after the first help request was sent, the controller 21 may recognize that assistance is unavailable. The first standby time is a predetermined time period that is assumed to be acceptable as a standby time for searching for a route, and may be set to one minute, for example.

The controller 21 presents the generated route to an occupant of the wheelchair 16 by causing the output interface 19 to output the generated route.

After generation of the route, in a case in which the announcement apparatus 12 is situated in a section to be travelled by the wheelchair 16 on the route, the controller 21 calculates an expected arrival time for the location of the announcement apparatus 12. The controller 21 uses the location of the requestor who requests the search for a route, the time at which the requestor is situated at the location, and the location of the announcement apparatus 12 to calculate the expected arrival time for the location of the announcement apparatus 12. The controller 21 considers, for example, the current location of the first information processing apparatus 10 and the current time as the location of the requestor of the search for a route and the time at which the requestor is situated at the location. To calculate the expected arrival time for the location of the announcement apparatus 12, the controller 21 reads the location of the announcement apparatus 12 stored in association with a link or a node from the memory 20. The controller 21 notifies the announcement apparatus 12 of the expected arrival time for the announcement apparatus 12 by sending information regarding the expected arrival time for the location of the announcement apparatus 12 via the communication interface 18.

The controller 21 may notify the announcement apparatus 12 of an expected arrival time for the location of the announcement apparatus 12 directly, or indirectly, via the second information processing apparatus 13. In a configuration in which the announcement apparatus 12 is directly notified of an expected arrival time for the location of the announcement apparatus 12, the controller 21 notifies the announcement apparatus 12 of an expected arrival time for the location of the announcement apparatus 12 in accordance with identification information for the announcement apparatus 12. In a configuration in which the announcement apparatus 12 is indirectly notified of an expected arrival time for the location of the announcement apparatus 12 via the second information processing apparatus 13, the controller 21 notifies the second information processing apparatus 13 of an expected arrival time for the location of the announcement apparatus 12 and identification information for the announcement apparatus 12.

In the case in which the specific type of facility described above is the second facility, after the route is generated, the controller 21 sends a request for help at the second facility, via the communication interface 18, as information regarding a second help request to the terminal apparatus 14 that will be situated in an area close to the second facility at the expected arrival time for the second facility. The area close to the second facility may be determined in the same manner as that of the area close to the first facility. The second help request may be sent to a plurality of the terminal apparatuses 14.

The controller 21 may send the second help request directly or via the second information processing apparatus 13 to the terminal apparatus 14. In a configuration in which the second help request is sent directly to the terminal apparatus 14, while the controller 21 is communicating with many terminal apparatuses 14, the controller 21 searches for at least one terminal apparatus 14 that will be situated in an area close to the second facility at the expected arrival time for the second facility, and sends the second help request to the found terminal apparatus 14. In a configuration in which the second help request is sent indirectly to the terminal apparatus 14 via the second information processing apparatus 13, the controller 21 sends the second help request to the second information processing apparatus 13.

When the acquisition interface 17 acquires, as assistance availability information indicating that assistance is available, a help acceptance response that is sent in response to the second help request by the terminal apparatus 14 and that will be described later, the controller 21 stores identification information for the terminal apparatus 14 included in the help acceptance response in the memory 20. The controller 21 also causes the output interface 19 to output an indication that the help request has been accepted. The controller 21 causes the output interface 19 to output the location of the second facility together with the indication that the help request has been accepted.

After the first help request or the second help request has been sent, the controller 21 determines whether the current location of the requestor of the search for the route is within a predetermined range from the specific type of facility. The controller 21 regards, for example, the current location of the first information processing apparatus 10 as being the current location of the requestor of the search for a route. The predetermined range is, for example, a range within a distance from a specific type of facility that a person who contemplates help can travel within an allowable time, specifically, a range with a radius of 50 m.

When a current location of a person who searches for a route is within the predetermined range from the specific type of facility, the controller 21 generates an approach notification including identification information for the first information processing apparatus 10. The approach notification is a notification that a person in need of assistance who is an occupant of the wheelchair 16 and also the person who searches for a route is currently situated close to the specific type of facility. The controller 21 may cause the output interface 19 to output an indication that the person in need of assistance is situated within the predetermined range from the specific type of facility at the same time as, before, or after the approach notification is generated.

The controller 21 sends the generated approach notification as information to the terminal apparatus 14 situated close to the specific type of facility via the communication interface 18. The controller 21 may send the approach notification to only the terminal apparatus 14 that has sent a help acceptance response in response to the help request in accordance with identification information on the terminal apparatus 14 that is extracted from the help acceptance response and stored in the memory 20. In a manner similar to the help request, the controller 21 may send the approach notification directly or via the second information processing apparatus 13 to the terminal apparatus 14.

The controller 21 determines whether travel assistance has been performed in response to an approach notification. The controller 21 may employ various methods to determine whether travel assistance has been performed. The controller 21 may determine in accordance with, for example, a user input by the occupant of the wheelchair 16, that travel assistance has been performed. Alternatively, the controller 21 may determine in accordance with, for example, change of the location of the first information processing apparatus 10, that travel assistance has been performed. Alternatively, the controller 21 may determine that travel assistance has been performed, in accordance with a code that is displayed on a display or the like of the terminal apparatus 14 and captured by a camera included in the first information processing apparatus 10.

In the case in which the controller 21 has not determined, by the time a second standby time has elapsed after the approach notification was sent, whether assistance has been performed, the controller 21 may determine that travel assistance has not been performed. The second standby time is a predetermined time length in which requested help is expected to be performed even if the wheelchair 16 or a helper comes after an expected arrival time for a corresponding facility, and may be set to ten minutes, for example.

When the controller 21 determines that travel assistance has been performed, a point is given to the helper who performed the travel assistance, via the communication interface 18. The controller 21 may employ various methods to give the point to a helper who has performed travel assistance.

For example, the controller 21 may give a point to the terminal apparatus 14 by establishing near-field communication with the terminal apparatus 14 via the communication interface 18, such that the point is given to a helper who owns the terminal apparatus 14. Alternatively, for example, the controller 21 may give a point to the terminal apparatus 14 by displaying a code on the output interface 19 as a display, which is captured by a camera of the terminal apparatus 14, as a result of which the point is given to the helper who owns the terminal apparatus 14. Alternatively, for example, the controller 21 may give a point to the terminal apparatus 14 by causing a camera included in the first information processing apparatus 10 to capture a code displayed on a display of the terminal apparatus 14 and the decoding the code. The controller 21 notifies the second information processing apparatus 13 of identification information for the terminal apparatus 14 acquired by decoding the code, and a point is given to the terminal apparatus 14 via the second information processing apparatus 13, as a result of which the point is given to the helper who owns the terminal apparatus 14.

Alternatively, in a configuration in which the second information processing apparatus 13 manages points, the controller 21 sends identification information for the helper or identification information from the terminal apparatus 14 owned by the helper to the second information processing apparatus 13 and a point is accordingly given to the helper. The controller 21 may employ various methods to acquire identification information for the helper or identification information for the terminal apparatus 14. The controller 21 may acquire identification information for the helper or identification information from the terminal apparatus 14, for example, by establishing near-field communication with the terminal apparatus 14 to acquire the identification information, by causing the output interface 19 as a display to display a code which is captured by a camera of the terminal apparatus 14 and sent by the terminal apparatus 14 to establish communication, or by capturing a code displayed on a display of the terminal apparatus 14 and decoding the code.

Figure 3:
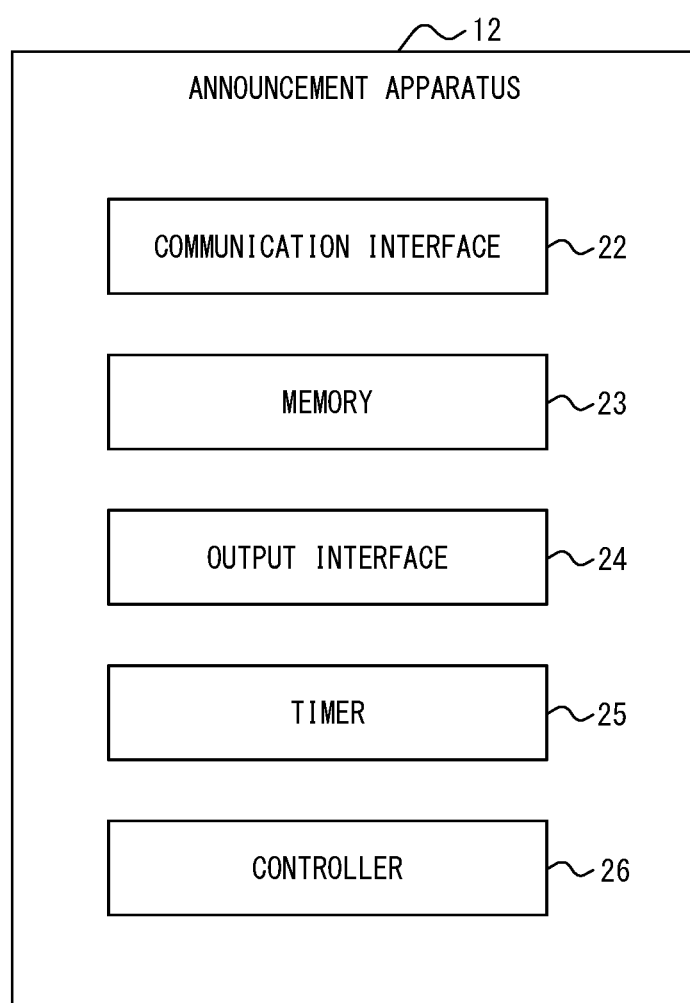
FIG. 3 is a functional block diagram schematically illustrating a configuration of an announcement apparatus in FIG. 1.

As illustrated in FIG. 3, the announcement apparatus 12 includes a communication interface 22, a memory 23, an output interface 24, a timer 25, and a controller 26.

The communication interface 22 includes a communication module that establishes a connection with the network 15. For example, the communication interface 22 may include a communication module compliant with mobile communication standards such as the fourth generation (4G) and the fifth generation (5G) mobile communication standards. In the present embodiment, the announcement apparatus 12 is connected to the network 15 via the communication interface 22.

The memory 23 may be, for example, but is not limited to, a semiconductor memory, a magnetic memory, an optical memory, or the like. The memory 23 may function as, for example, a primary storage, an auxiliary storage, or a cache memory. The memory 23 stores any information that is used for operation of the announcement apparatus 12. The memory 23 may store, for example, a system program and an application program. The memory 23 stores identification information on the announcement apparatus 12. The information stored in the memory 23 may be updated using, for example, information acquired from the network 15 via the communication interface 22.

The output interface 24 includes at least one interface that outputs information to notify users. For example, the output interface 24 may be, but is not limited to, a display that outputs information as an image or a speaker that outputs information as sound.

The timer 25 provides information regarding a current time.

The controller 26 includes at least one processor. The controller 26 controls the entire operation of the announcement apparatus 12.

The controller 26 stores in the memory 23 an expected arrival time for a facility acquired from the first information processing apparatus 10.

The controller 26 determines an announcement time based on the acquired expected arrival time for the facility. The announcement time is a predetermined time period, such as two minutes. The announcement time should include the expected arrival time for the facility; for example, the announcement time is determined such that the middle of the announcement time is the expected arrival time for the facility.

The controller 26 determines whether the current time reaches a start time of the announcement time. When the current time reaches the start time of the announcement time, the controller 26 causes the output interface 24 to start outputting an indication that a person in need of assistance is approaching. The controller 26 stops outputting the indication after the announcement time period has elapsed.

Figure 4:
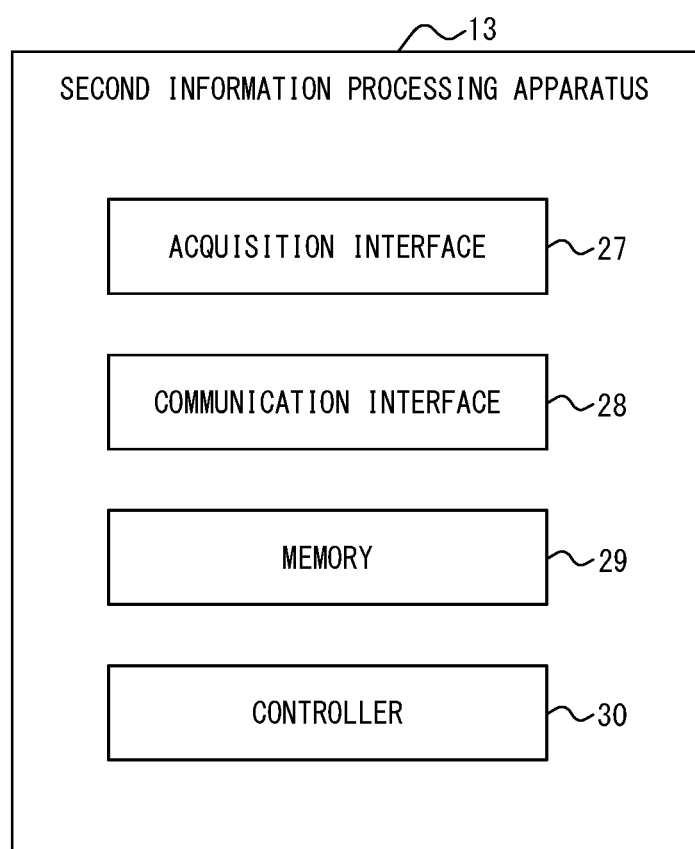
FIG. 4 is a functional block diagram schematically illustrating a configuration of a second information processing apparatus in FIG. 1.

As illustrated in FIG. 4, the second information processing apparatus 13 includes an acquisition interface 27, a communication interface 28, a memory 29, and a controller 30.

The acquisition interface 27 includes, for example, a communication module that establishes connection with the network 15. The acquisition interface 27 may include, for example, a communication module compliant with a wired local area network (LAN) standard. In the present embodiment, the second information processing apparatus 13 is connected to the network 15 via the acquisition interface 27. The acquisition interface 27 can acquire, from the first information processing apparatus 10, information regarding a route generated by the first information processing apparatus 10, an expected arrival time for the announcement apparatus 12, a help request, an approach notification, a point to be given to a helper, and the like. The acquisition interface 27 can acquire, from the terminal apparatus 14, information regarding a help acceptance response.

The communication interface 28 includes, for example, a communication module that establishes connection with the network 15. The communication interface 28 may include a communication module compliant with, for example, a wired LAN standard. The communication interface 28 sends, for example, at least one of the various kinds of information described later to the first information processing apparatus 10 and the terminal apparatus 14. The communication interface 28 may be provided in combination with the acquisition interface 27.

The memory 29 may be, for example, but is not limited to, a semiconductor memory, a magnetic memory, an optical memory, or the like. The memory 29 may function as, for example, a primary storage, an auxiliary storage, or a cache memory. The memory 29 stores any information that is used for an operation of the second information processing apparatus 13. The memory 29 may store a system program and an application program. The memory 29 may store links and nodes that constitute various routes in association with accessibility conditions with respect to individual types of vehicle, including the wheelchair 16. The memory 29 may store a location of or identification information for the announcement apparatus 12 in association with at least a link and node on any of which the announcement apparatus 12 exists. The information stored in the memory 29 may be updated using, for example, information acquired from the network 15 via the acquisition interface 27.

The controller 30 includes at least one processor. The controller 30 controls the entire operation of the second information processing apparatus 13.

The controller 30 provides, for the first information processing apparatus 10 and the terminal apparatus 14 through the network 15, a website for a support service for people in need of assistance, which is managed by an administrator of the second information processing apparatus 13. On the website, the controller 30 may recruit helpers, register helpers, and register requests for provision of services submitted by people in need of assistance.

When the controller 30 receives a request for registration of assistance support from the terminal apparatus 14, the controller 30 stores in the memory 29 a schedule of an owner of the terminal apparatus 14 in association with identification information for the terminal apparatus 14. The schedule for the owner contains locations of the owner at different times.

When the controller 30 receives a request for provision of an assistance service from the first information processing apparatus 10, the controller 30 registers the first information processing apparatus 10 by storing identification information on the first information processing apparatus 10 in the memory 29. The controller 30 sends to the registered first information processing apparatus 10 links and nodes at which travel by the wheelchair 16 is possible and links and nodes for each transportation option. When any change is needed for the availability condition of a particular transportation option at a particular link and particular nodes that have been sent, the controller 30 sends the particular link and particular nodes subject to the change to the registered first information processing apparatus 10.

When the controller 30 acquires from the first information processing apparatus 10 an expected arrival time for the announcement apparatus 12 and identification information on the announcement apparatus 12, the controller 30 reports the expected arrival time for the announcement apparatus 12 in accordance with the acquired identification information for the announcement apparatus 12.

When the controller 30 receives a help request from the first information processing apparatus 10, the controller 30 stores in the memory 29 the help request in association with the identification information on the first information processing apparatus 10. The controller 30 also detects in the memory 29 an owner who will be situated at the location of a specific type of facility at an expected arrival time for the specific type of facility.

The controller 30 determines the owner who will be situated at the location of the specific type of facility in accordance with the schedule of the owner of the terminal apparatus 14 for which assistance support stored in the memory 29 is registered. When the controller 30 determines such an owner, the controller 30 sends to the terminal apparatus 14 of the owner a help request including identification information for the second information processing apparatus 13.

The controller 30 stores in the memory 29 the identification information for the terminal apparatus 14 to which a help request has been sent, in association with the identification information for the first information processing apparatus 10 that has submitted the help request. In a case in which the number of the terminal apparatuses 14 to which the first help request is sent exceeds a threshold, the controller 30 may inform the first information processing apparatus 10 that the number of the terminal apparatuses 14 to which the first help request is sent exceeds the threshold.

When a help acceptance response is received from the terminal apparatus 14 in response to a help request, the controller 30 extracts identification information for the first information processing apparatus 10 from the help acceptance response. In accordance with the extracted identification information, the controller 30 sends the help acceptance response to the first information processing apparatus 10 which submitted the help request. The controller 30 stores in the memory 29 the identification information for the terminal apparatus 14 which sent the help acceptance response, in association with the identification information for the first information processing apparatus 10.

When an approach notification is received from the first information processing apparatus 10, the controller 30 sends the approach notification to the terminal apparatus 14 corresponding to the identification information stored in association with the identification information for the first information processing apparatus 10.

When the controller 30 receives a point sent from the first information processing apparatus 10 to the terminal apparatus 14, the controller 30 stores the point in the memory 29 in a manner in which the point is added to points stored in association with the identification information for the terminal apparatus 14. The controller 30 may wait to perform point addition processing until a third standby time has elapsed after the expected arrival time for the specific type of facility corresponding to the help request. The third standby time is, similar to the second standby time, a predetermined time and may be set to, for example, ten minutes. The third standby time can be different from the second standby time.

Figure 5:
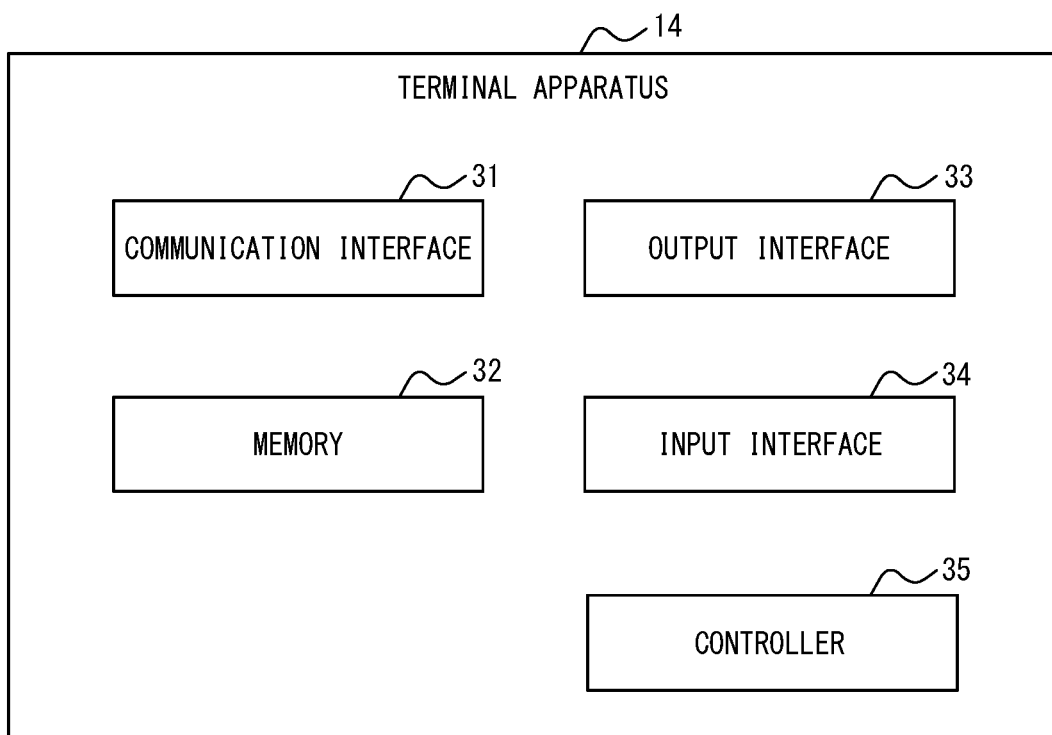
FIG. 5 is a functional block diagram schematically illustrating a configuration of a terminal apparatus in FIG. 1.

As illustrated in FIG. 5, the terminal apparatus 14 includes a communication interface 31, a memory 32, an output interface 33, an input interface 34, and a controller 35.

The communication interface 31 includes a communication module that establishes connection with the network 15. For example, the communication interface 31 may include a communication module compliant with mobile communication standards such as 4G and 5G. In the present embodiment, the terminal apparatus 14 is connected to the network 15 via the communication interface 31.

The memory 32 may be, for example, but is not limited to, a semiconductor memory, a magnetic memory, an optical memory, or the like. The memory 32 may function as, for example, a primary storage, an auxiliary storage, or a cache memory. The memory 32 stores any information that is used for an operation of the terminal apparatus 14. The memory 32 may store, for example, a system program, an application program, and identification information on the terminal apparatus 14. The information stored in the memory 32 may be updated by using, for example, information acquired from the network 15 via the communication interface 31.

The output interface 33 includes at least one interface that outputs information to notify users. For example, the output interface 33 is, but not limited to, a display that outputs information in the form of images or a speaker that outputs information in the form of sound.

The input interface 34 includes at least one interface that detects user inputs. For example, the input interface 34 may be, but is not limited to, physical keys, capacitive keys, a touch screen provided in combination with a display of the output interface 33, or a microphone that accepts sound input.

The controller 35 includes at least one processor. The controller 35 controls the entire operation of the terminal apparatus 14.

When a help request is received from the first information processing apparatus 10 or the second information processing apparatus 13, the controller 35 extracts identification information for the first information processing apparatus 10. Additionally, when the help request includes identification information for the second information processing apparatus 13, the controller 35 extracts the identification information. The controller 35 stores in the memory 32 the extracted identification information in association with the help request.

Further, the controller 35 causes the output interface 33 to output a location for which assistance is requested and an expected arrival time for the location. The controller 35 may cause the output interface 33 to output a request for an input that indicates whether help can be provided in response to a help request. When the input interface 34 detects a user input indicating that help can be provided, the controller 35 sends to the first information processing apparatus 10 a help acceptance response including identification information for the first information processing apparatus 10 and identification information on the terminal apparatus 14. The controller 35 may continue to determine whether a user input of a help acceptance response is sent until an expected arrival time for a facility is reached after a help request is received.

The controller 35 may send a help acceptance response directly to the first information processing apparatus 10 or indirectly via the second information processing apparatus 13 to the first information processing apparatus 10. The controller 35 sends a help acceptance response to the first information processing apparatus 10 in accordance with identification information for the first information processing apparatus 10 stored in the memory 32. Alternatively, the controller 35 sends a help acceptance response to the second information processing apparatus 13 in accordance with identification information for the second information processing apparatus 13 stored in the memory 32.

When an approach notification is received from the first information processing apparatus 10 or the second information processing apparatus 13, the controller 35 causes the output interface 33 to output an indication that performing assistance is requested. The controller 35 may cause the output interface 33 to output a request for an input indicating completion of assistance in response to an approach notification. When the input interface 34 detects a user input indicating completion of assistance, the controller 35 may cause the output interface 33 to output an indication to request a point from the first information processing apparatus 10. As described above, the controller 35 may employ various methods that can be implemented by the first information processing apparatus 10 to acquire a point as a helper point. The controller 35 may continue to wait until a user input indicating completion of assistance is detected after an approach notification is received and before a fourth standby time has elapsed. The fourth standby time is a predetermined time period during which an owner of the terminal apparatus 14 recognizes information outputted by the output interface 33 at approximately the expected arrival time for the facility, looks for a person in need of assistance, and completes assistance, and may be set to five minutes, for example.

Figure 6:
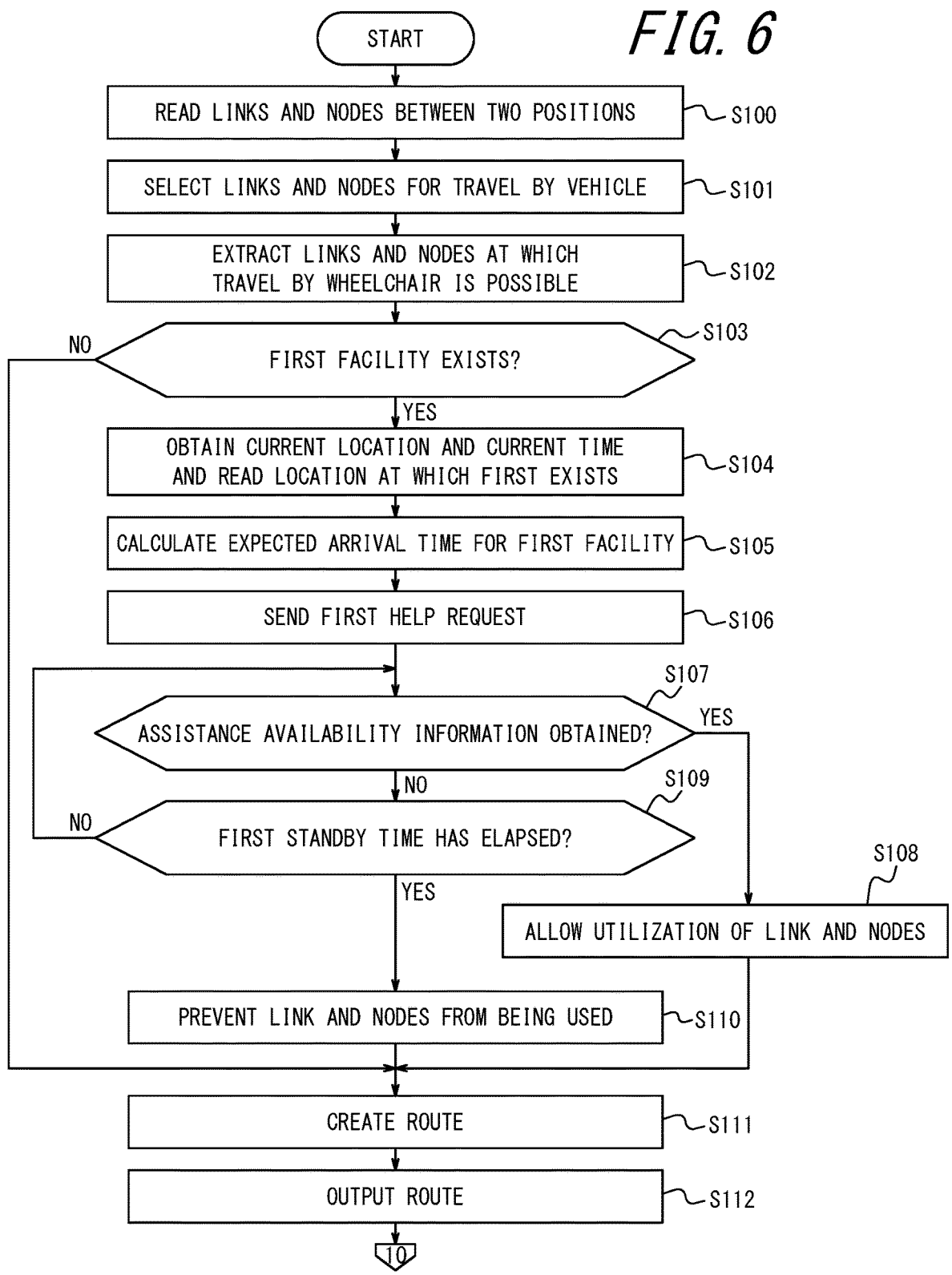
FIG. 6 is a first flowchart illustrating route generation processing performed by a controller of the first information processing apparatus in FIG. 2.
Figure 7:
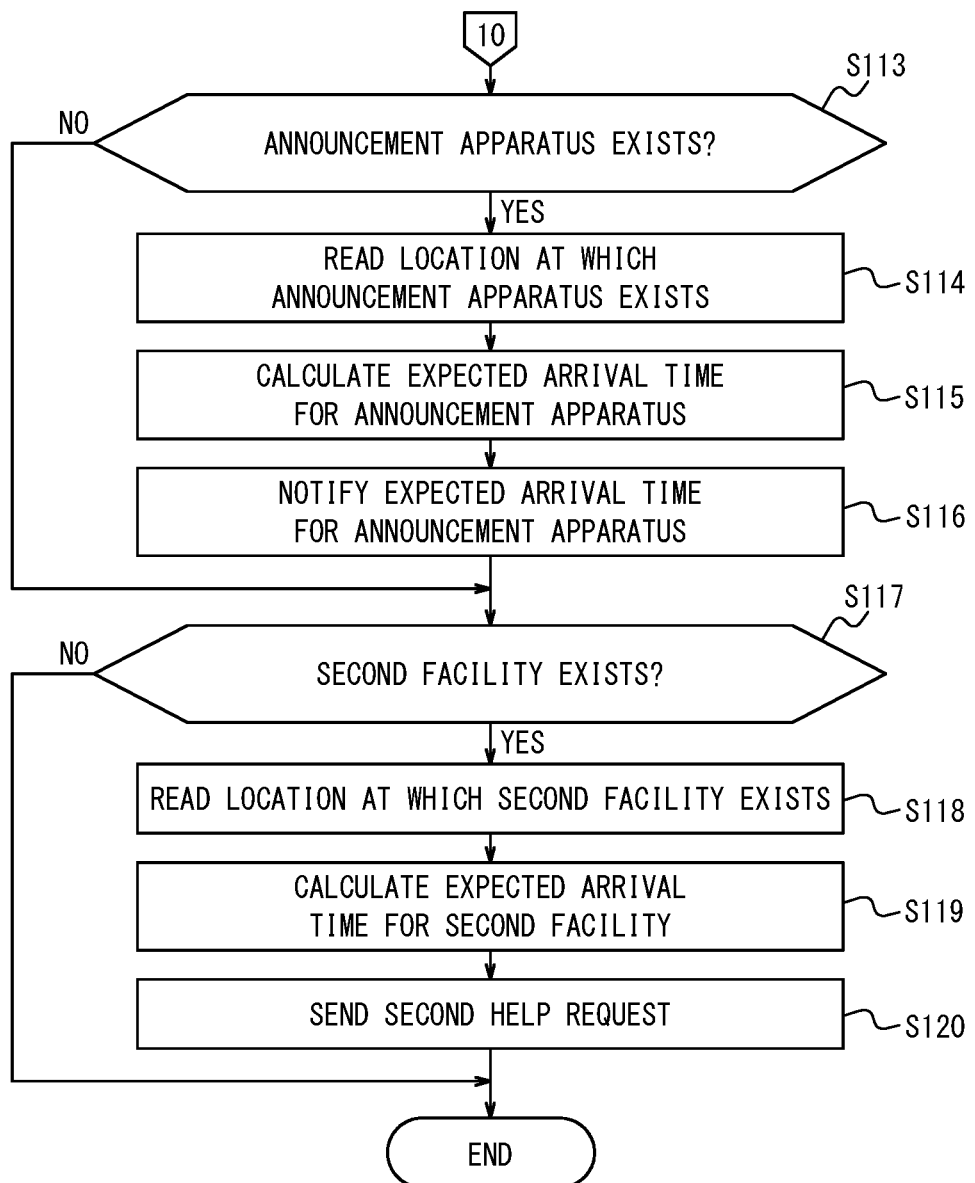
FIG. 7 is a second flowchart illustrating the route generation processing performed by the controller of the first information processing apparatus in FIG. 2.

Next, route generation processing performed by the controller 21 of the first information processing apparatus 10 in the present embodiment is described with reference to flowcharts in FIG. 6 and FIG. 7. The route generation processing is started when, for example, the acquisition interface 17 acquires a request for a search for a route between two locations.

In step S100, the controller 21 reads, from the memory 20, links and nodes between two locations for which a search for a route is requested. After the links and nodes have been read, the process proceeds to step S101.

In step S101, the controller 21 selects, from the links and nodes read in step S100, links and nodes as candidates to form a section in which a vehicle other than the wheelchair 16 is used on the route between the two locations. After the links and nodes are selected, the process proceeds to step S102.

In step S102, the controller 21 excludes the links and nodes selected in step S101 from the links and nodes read in step S100. Subsequently, the controller 21 extracts, from the remainder of the links and nodes after the exclusion, links and nodes at which travel by the wheelchair 16 is possible. After the links and nodes are extracted, the process proceeds to step S103.

In step S103, the controller 21 determines whether a first facility exists in the links and nodes extracted in step S102. In the case in which a first facility does not exist in the links and nodes, the process proceeds to step S111. In the case in which a first facility exists in the links and nodes, the process proceeds to step S104.

In step S104, the controller 21 acquires, from the acquisition interface 17 a current location of the first information processing apparatus 10 and a current time. The controller 21 also reads from the memory 20 a location at which the first facility, the existence of which is determined in step S103, is situated. After the current location and the current time are acquired and the location is read, the process proceeds to step S105.

In step S105, the controller 21 calculates an expected arrival time for the first facility in accordance with the current location and the current time acquired in step S104 and the location read in step S104. After the expected arrival time is calculated, the process proceeds to step S106.

In step S106, the controller 21 sends, directly or indirectly, the first help request containing the expected arrival time for the first facility calculated in step S105 and identification information on the first information processing apparatus 10 to the terminal apparatus 14. After the first help request is sent, the process proceeds to step S107.

In step S107, the controller 21 determines whether assistance availability information indicating that assistance is available has been acquired. In the case in which the information is acquired, the process proceeds to step S108. In the case in which the information is not acquired, the process proceeds to step S109.

In step S108, the controller 21 allows use of the links and the node which have the first facility, the existence of which is determined in step S103, in generation of a route. After the use is allowed, the process proceeds to step S111.

In step S109, the controller 21 determines whether the first standby time has elapsed after the first help request was sent. In the case in which the first standby time has not elapsed, the process returns to step S107. In the case in which the first standby time has elapsed, the process proceeds to step S110.

In step S110, the controller 21 prevents the links and nodes having the first facility, the existence of which is determined in step S103, from being used in generation of a route. After the use is prevented, the process proceeds to step S111.

In step S111, the controller 21 generates a route using the links and nodes selected in step S101, and all the links and nodes extracted in step S102 or links and nodes acquired by excluding the links and nodes prevented from being used in step S110 from the links and nodes extracted in step S102. After the route is generated, the process proceeds to step S112.

In step S112, the controller 21 causes the output interface 19 to output the route generated in step S111. After the route is outputted, the process proceeds to step S113.

In step S113, the controller 21 determines whether the announcement apparatus 12 exists in a section to be traveled by the wheelchair 16 on the route generated in step S111. In the case in which the announcement apparatus 12 does not exist, the process proceeds to step S117. In the case in which the announcement apparatus 12 exists, the process proceeds to step S114.

In step S114, the controller 21 reads, from the memory 20, a location at which existence of the announcement apparatus 12 was determined in step S113. After the location is read, the process proceeds to step S115.

In step S115, the controller 21 calculates an expected arrival time for the announcement apparatus 12 in accordance with the current location and the current time acquired in step S104 and the location read in step S114. After the expected arrival time is calculated, the process proceeds to step S116.

In step S116, the controller 21 directly or indirectly notifies the announcement apparatus 12 of the expected arrival time for the announcement apparatus 12, the expected arrival time including identification information for the first information processing apparatus 10. After the announcement apparatus 12 is notified, the process proceeds to step S117.

In step S117, the controller 21 determines whether a second facility exists in the section to be traveled by the wheelchair 16 on the route generated in step S111. In the case in which a second facility does not exist, the route generation processing is ended. In the case in which a second facility exists, the process proceeds to step S118.

In step S118, the controller 21 reads from the memory 20 a location at which existence of the second facility is determined in step S117. After the location is read, the process proceeds to step S119.

In step S119, the controller 21 calculates an expected arrival time for the second facility in accordance with the current location and the current time acquired in step S104 and the location read in step S118. After the expected arrival time is calculated, the process proceeds to step S120.

In step S120, the controller 21 sends the second help request containing the expected arrival time for the second facility calculated in step S119 and identification information for the first information processing apparatus 10 directly or indirectly to the terminal apparatus 14. After the second help request is sent, the route generation processing is ended.

Figure 8:
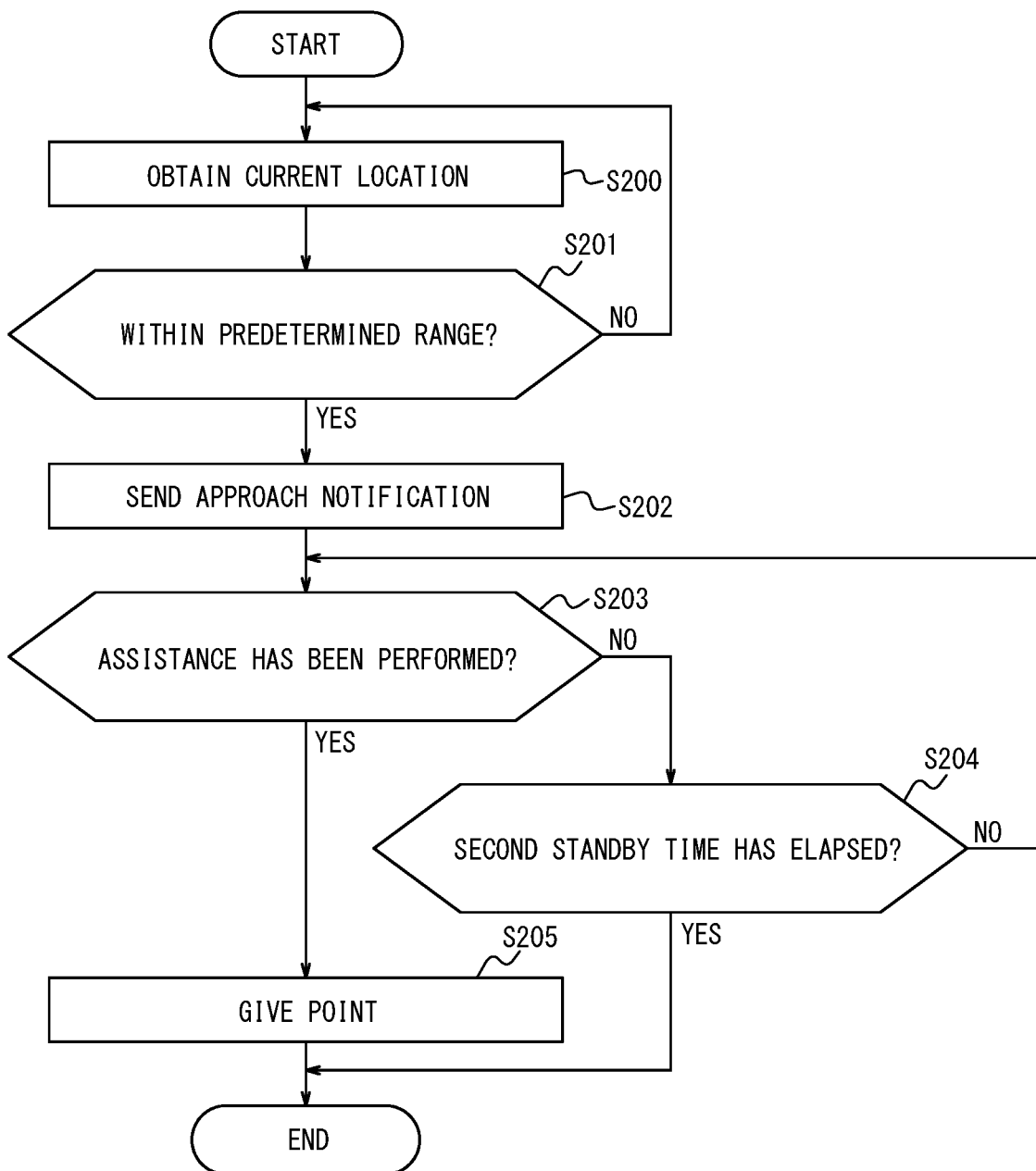
FIG. 8 is a flowchart illustrating assistance reception processing performed by the controller of the first information processing apparatus in FIG. 2.

Next, assistance reception processing performed by the controller 21 of the first information processing apparatus 10 in the present embodiment is described with reference to a flowchart in FIG. 8. The assistance reception processing is started after a help request is sent.

In step S200, the controller 21 acquires, from the acquisition interface 17, a current location of the first information processing apparatus 10. After the current location is acquired, the process proceeds to step S201.

In step S201, the controller 21 determines whether the current location acquired in step S200 is within a predetermined range from a specific type of facility targeted in a sent help request. In the case in which the current location is outside the predetermined range, the process returns to step S200. In the case in which the current location is within the predetermined range, the process proceeds to step S202.

In step S202, the controller 21 sends, to the terminal apparatus 14 to which the help request has been sent, an approach notification containing an expected arrival time for the specific type of facility, from which it is determined in step S201 that the current location of the first information processing apparatus 10 is within the predetermined range. After the approach notification is sent, the process proceeds to step S203.

In step S203, the controller 21 determines whether assistance has been performed. In the case in which assistance has not been performed, the process proceeds to step S204. In the case in which assistance has been performed, the process proceeds to step S205.

In step S204, the controller 21 determines whether the second standby time has elapsed after an approach notification was sent in step S202. In the case in which the second standby time has not elapsed, the process returns to step S203. In the case in which the second standby time has elapsed, the assistance reception processing is ended.

In step S205, the controller 21 gives a point to a helper who has performed assistance. After the point is given, the assistance reception processing is ended.

Figure 9:
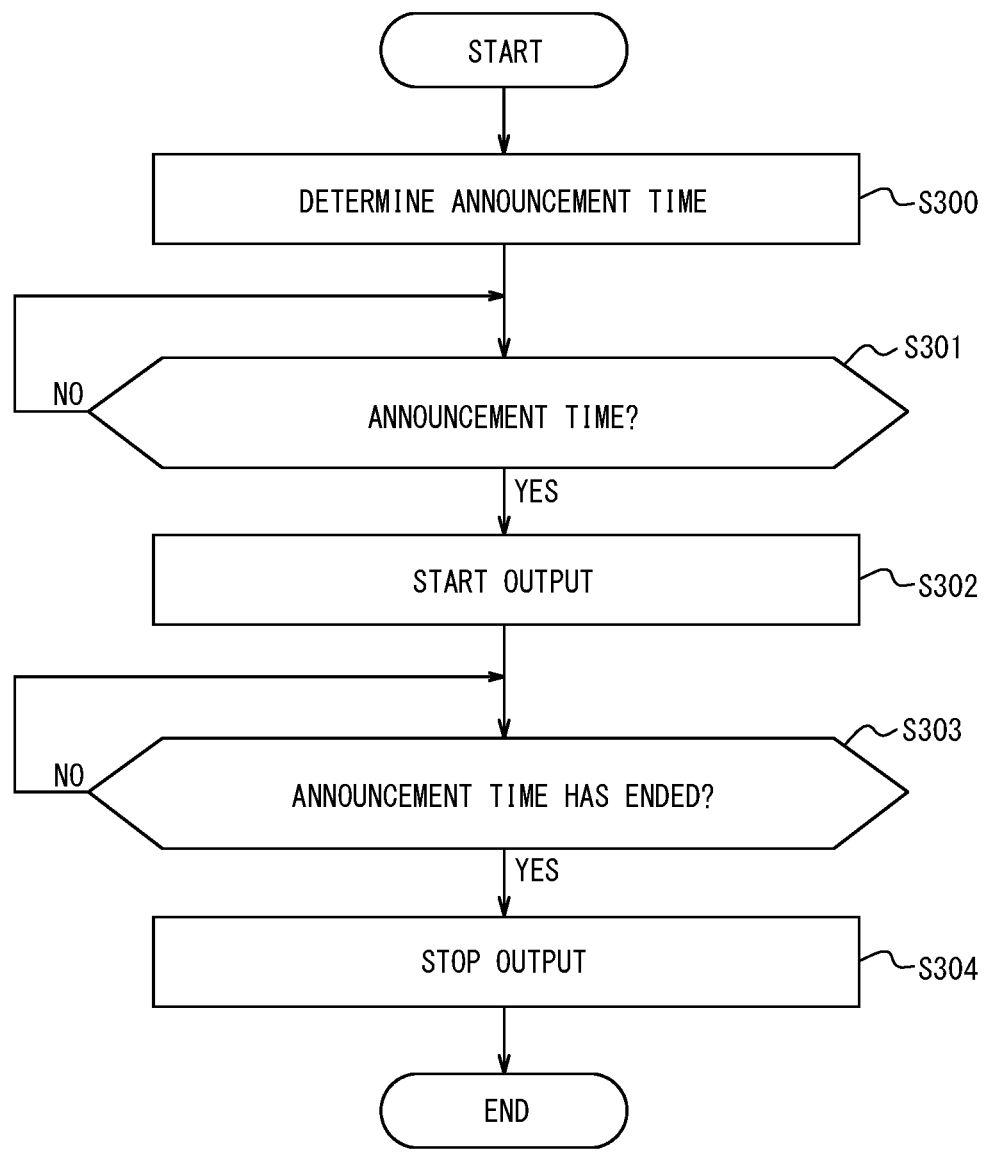
FIG. 9 is a flowchart illustrating announcement processing performed by a controller of the announcement apparatus in FIG. 3.

Next, announcement processing performed by the controller 26 of the announcement apparatus 12 in the present embodiment is described with reference to a flowchart in FIG. 9. The announcement processing is started after an expected arrival time for the location of the announcement apparatus 12 is acquired from the first information processing apparatus 10.

In step S300, the controller 26 determines an announcement time in accordance with an expected arrival time for the announcement apparatus 12 acquired from the first information processing apparatus 10. After the announcement time is determined, the process proceeds to step S301.

In step S301, the controller 26 determines whether a start time of the announcement time determined in step S300 is reached. In the case in which the start time is not reached, the process returns to step S301. In the case in which the start time is reached, the process proceeds to step S302.

In step S302, the controller 26 causes the output interface 24 to start outputting to a surrounding area an announcement to encourage priority use of the facility by a person in need of assistance. After the announcement is outputted, the process proceeds to step S303.

In step S303, the controller 26 determines whether an end time of the announcement time determined in step S300 is reached. In the case in which the end time is not reached, the process returns to step S303. In the case in which the end time is reached, the process proceeds to step S304.

In step S304, the controller 26 causes the output interface 24 to stop outputting the announcement which started in step S302. After the announcement is stopped, the announcement processing is ended.

Next, help request processing performed by the controller 30 of the second information processing apparatus 13 in the present embodiment is described with reference to a flowchart in FIG. 10. The help request processing is started after a help request is received from the first information processing apparatus 10.

In step S400, the controller 30 extracts from the help request a location of a specific type of facility, an expected arrival time for the specific type of facility, and identification information on the first information processing apparatus 10. The controller 30 also detects in the memory 29 the terminal apparatus 14 owned by an owner who is to stay at the location of the specific type of facility at the expected arrival time for the specific type of facility. The controller 30 also stores in the memory 29 the identification information for the first information processing apparatus 10 in association with the help request. After the identification information is stored, the process proceeds to step S401.

In step S401, the controller 30 sends the received help request to the terminal apparatus 14 detected in step S400. After the help request is sent, the help request processing is ended.

Next, help-request acceptance processing performed by the controller 30 of the second information processing apparatus 13 in the present embodiment is described with reference to a flowchart in FIG. 11. The help-request acceptance processing is started after a help acceptance response is received from the terminal apparatus 14.

In step S500, the controller 30 extracts identification information for the first information processing apparatus 10 from the help acceptance response. In accordance with the identification information, the controller 30 determine the first information processing apparatus 10 which sent a help request. After the first information processing apparatus 10 is detected, the process proceeds to step S501.

In step S501, the controller 30 sends the help acceptance response to the first information processing apparatus 10 determined in step S500. The controller 30 also stores in the memory 29 the identification information on the terminal apparatus 14 which sent the help acceptance response in association with the identification information on the first information processing apparatus 10. After the identification information is stored, the help-request acceptance processing is ended.

Next, approach notification processing performed by the controller 30 of the second information processing apparatus 13 in the present embodiment is described with reference to a flowchart in FIG. 12. The approach notification processing is started after an approach notification is received from the first information processing apparatus 10.

In step S600, the controller 30 extracts identification information for the first information processing apparatus 10 from the approach notification. The controller 30 also reads from the memory 29 identification information on the terminal apparatus 14 associated with the identification information on the first information processing apparatus 10. In accordance with the identification information, the controller 30 detects the terminal apparatus 14 to which the approach notification is to be sent. After the terminal apparatus 14 is detected, the process proceeds to step S601.

In step S601, the controller 30 sends the approach notification to the terminal apparatus 14 detected in step S600. After the approach notification is sent, the process proceeds to step S602.

In step S602, the controller 30 determines whether determines whether a point has been given from the first information processing apparatus 10 to the terminal apparatus 14. In the case in which it is not determine, the process proceeds to step S603. In the case in which it is determined, the process proceeds to step S604.

In step S603, the controller 30 determines whether the third standby time has elapsed since the approach notification was sent. In the case in which the third standby time has elapsed, the approach notification processing is ended. In the case in which the third standby time has not elapsed, the process returns to step S602.

In step S604, the controller 30 extracts identification information for the terminal apparatus 14 sent together with the point which was given, which was determined in step S602. The controller 30 also stores the point in the memory 29 in a manner in which the point is added to points associated with the identification information on the terminal apparatus 14. After the point is stored, the approach notification processing is ended.

Figure 13:
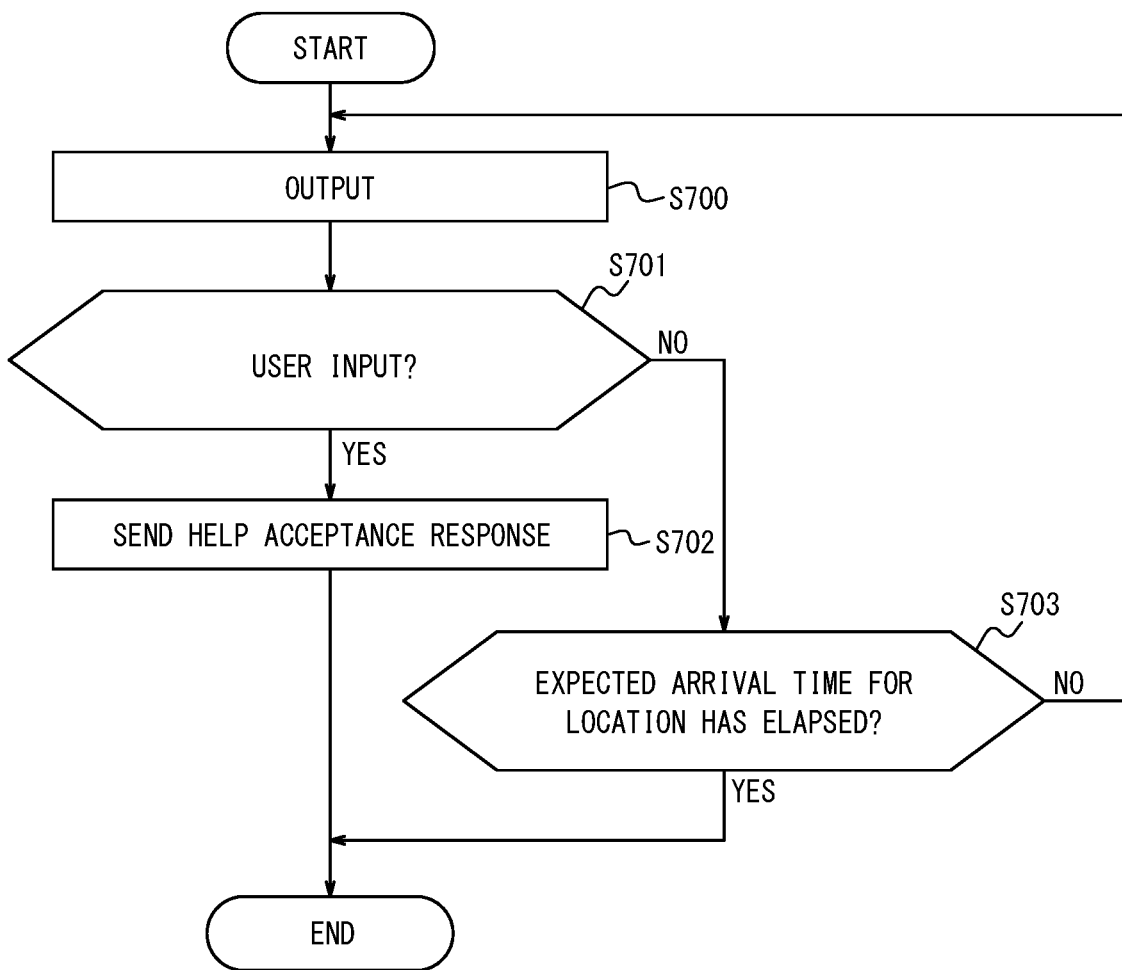
FIG. 13 is a flowchart illustrating help notification processing performed by a controller of the terminal apparatus in FIG. 5.

Next, help notification processing performed by the controller 35 of the terminal apparatus 14 in the present embodiment is described with reference to a flowchart in FIG. 13. The help notification processing is started after a help request is received.

In step S700, the controller 35 extracts identification information for the first information processing apparatus 10 from the received help request. Additionally, when the help request includes identification information for the second information processing apparatus 13, the controller 35 extracts the identification information on the second information processing apparatus 13. The controller 35 then stores in the memory 32 the extracted identification information in association with the help request. The controller 35 then causes, in accordance with the help request, the output interface 33 to output a location at which assistance is requested and an expected arrival time for the location. After the location and the expected arrival time are outputted, the process proceeds to step S701.

In step S701, the controller 35 determines whether the input interface 34 detects a user input indicating whether help can be provided. In the case in which the user input is detected, the process proceeds to step S702. In the case in which the user input is not detected, the process proceeds to step S703.

In step S702, the controller 35 sends a help acceptance response to the first information processing apparatus 10 which sent the help request in accordance with identification information on the first information processing apparatus 10 stored in the memory 32. After the help acceptance response is sent, the help notification processing is ended.

In step S703, the controller 35 determines whether an expected arrival time for the location has elapsed, the expected arrival time being included in the acquired help request. In the case in which the expected arrival time has not elapsed, the process returns to step S701. In the case in which the expected arrival time has elapsed, the help notification processing is ended.

Figure 14:
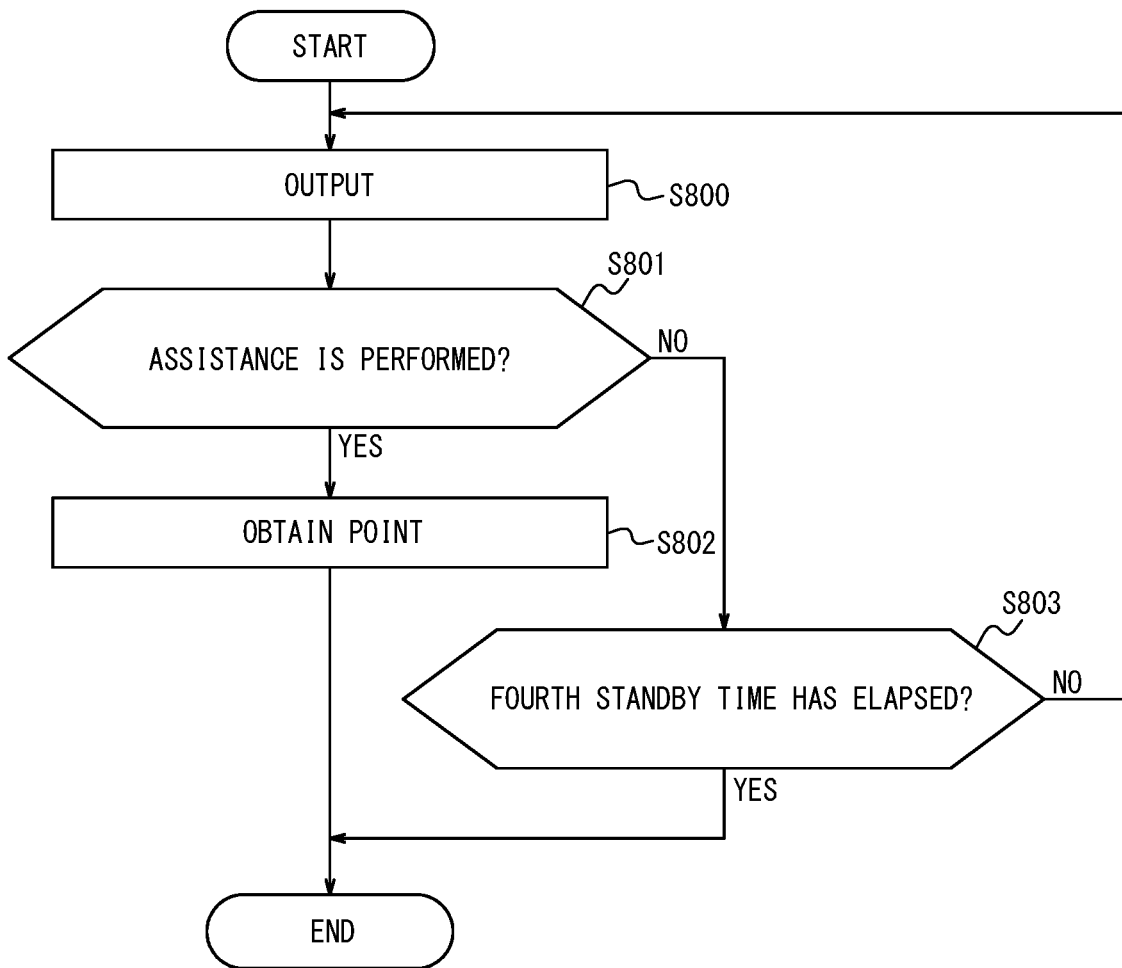
FIG. 14 is a flowchart illustrating performance notification processing performed by the controller of the terminal apparatus in FIG. 5.

Next, performance notification processing performed by the controller 35 of the terminal apparatus 14 in the present embodiment is described with reference to a flowchart in FIG. 14. The performance notification processing is started after an approach notification is received.

In step S800, the controller 35 causes, in accordance with the received approach notification, the output interface 33 to output an indication that performing assistance is requested. After the indication is outputted, the process proceeds to step S801.

In step S801, the controller 35 determines whether the input interface 34 detects a user input indicating completion of assistance. In the case in which the user input is detected, the process proceeds to step S802. In the case in which the user input is not detected, the process proceeds to step S803.

In step S802, the controller 35 causes the output interface 33 to output a request for a point from the first information processing apparatus 10. The controller 35 then acquires a point from the first information processing apparatus 10 in accordance with various methods. After the point is acquired, the performance notification processing is ended.

In step S803, the controller 35 determines whether the fourth standby time has elapsed after the approach notification was acquired. In the case in which the fourth standby time has not elapsed, the process returns to step S801. In the case in which the fourth standby time has elapsed, the performance notification processing is ended.

The first information processing apparatus 10 according to the present embodiment configured as described above generates, by using links and nodes at which travel by the wheelchair 16 is possible, a section that is included in a route between two locations and that is to be traveled by the wheelchair 16, when a search for the route between the two locations is requested. With this configuration, the first information processing apparatus 10 can enable a person in need of assistance, who may be an occupant of the wheelchair 16, to recognize a route reaching a point of interest by using the wheelchair 16. Thus, the first information processing apparatus 10 can enable a person in need of assistance to realize a route which can be entirely traveled without an attendant for assistance, even when the point of interest is an unfamiliar facility. As a result, the first information processing apparatus 10 can encourage people in need of assistance to go out without an attendant. As such, the first information processing apparatus 10 can help people in need of assistance when outdoors.

Furthermore, the first information processing apparatus 10 according to the present embodiment notifies the announcement apparatus 12 of an expected arrival time for the announcement apparatus 12 when the announcement apparatus 12 is situated in the section to be traveled by the wheelchair 16 on the generated route. With this configuration, the first information processing apparatus 10 can cause the announcement apparatus 12, which is installed in a facility such as an elevator or a retail establishment on the way, to announce the presence of a person in need of assistance to users of the facility equipped with the announcement apparatus 12 at approximately expected arrival time for the announcement apparatus 12. As a result, the first information processing apparatus 10 can encourage users of the facility to offer priority use of the facility to a person in need of assistance, such that the first information processing apparatus 10 can further help people in need of assistance outdoors.

Further, when the section to be traveled by the wheelchair 16 on the route includes a specific type of facility, the first information processing apparatus 10 according to the present embodiment sends a help request for an expected arrival time for the facility. With this configuration, the first information processing apparatus 10 can cause people in an area close to the specific type of facility to recognize a request for help at the specific type of facility. As a result, the first information processing apparatus 10 can cause people who desire to do easy voluntary work to recognize a need for help and this can thus increase the possibility that travel assistance may be performed.

Moreover, when the specific type of facility is a first facility, the first information processing apparatus 10 according to the present embodiment sends a first help request for the first facility, and when it is recognized for the first help request that assistance is available at the links and nodes which pass through the first facility, the first information processing apparatus 10 allows use of the link and nodes in generation of a section to be traveled by the wheelchair 16 on the route. With this configuration, the first information processing apparatus 10 can generate a relatively short route when there a helper is available. In addition, with this configuration, by determining, as the first facility, a facility at which traveling alone is difficult for a person in need of assistance, such as a very steep sloping road or a platform at which passengers get on and off a vehicle or a train, the first information processing apparatus 10 can encourage help at the first facility, and consequently, this makes it possible to travel by the wheelchair 16 at a place at which a facility for people in need of assistance cannot be provided due to investment efficiency or the like.

Furthermore, when a current location of a requestor who searches for a route is within the predetermined range from the specific type of facility, the first information processing apparatus 10 according to the present embodiment sends an approach notification. With this configuration, the first information processing apparatus 10 can cause people around a person in need of assistance to recognize that a requestor of a search for a route is approaching and the first information processing apparatus 10 can request the people to perform assistance without the person in need of assistance directly asking the people for assistance.

Further, when travel assistance is performed, the first information processing apparatus 10 according to the present embodiment sends a point to the helper. With this configuration, the first information processing apparatus 10 can offer an incentive to perform travel assistance by the wheelchair 16 and this can thus encourage more people to perform travel assistance.

While the present disclosure has been described with reference to the accompanying drawings and the examples, it should be understood that various changes and modifications based on the present disclosure may be easily made by those skilled in the art. It should be noted that these changes and modifications are therefore encompassed within the scope of the present disclosure. For example, the functions and the like included in the constituents, steps, and the like may be rearranged in a logically consistent manner; a plurality of constituents, steps, or the like may be combined together or divided.

For example, part of the processing operation performed by the first information processing apparatus 10 in the embodiment described above may be carried out by the second information processing apparatus 13. For example, the second information processing apparatus 13 may acquire from the first information processing apparatus 10 a request for a search for a route between two locations, generate a route that is partially composed of links and nodes to be traveled by a vehicle other than the wheelchair 16 and the rest of which is composed of links and nodes at which travel by the wheelchair 16 is possible between the two locations, and send the generated route to the first information processing apparatus 10. Additionally, in a configuration in which the second information processing apparatus 13 generates a route, when the number of the terminal apparatuses 14 to which the first help request is sent exceeds a threshold, it may be recognized that travel assistance at the first facility is available.

Furthermore, for example, a general electronic device such as a smartphone or a computer may be configured to function as the first information processing apparatus 10 or the second information processing apparatus 13 according to the embodiment described above. Specifically, a program in which details of processing for implementing the function of, for example, the first information processing apparatus 10 according to the embodiment are written is stored in a memory of an electronic device; a processor of the electronic device reads and runs the program. Thus, the disclosure according to the present embodiment may be implemented as a program that can be run by a processor. The program may be downloaded via a network 15; or the program may be stored in a portable non-transitory recording/storage medium readable by electronic devices and the program may be read from the medium by an electronic device.

The invention claimed is:

1. An information processing apparatus comprising:
a controller configured to:
upon recognizing a request for a search for a route between two locations, generate, using a link and a node at which travel by a wheelchair is possible, a section of the route to be traveled by the wheelchair;
send a request for assistance at a section that passes through a specific type of facility included in the section of the route to be traveled by the wheelchair, the request including an expected arrival time for the specific type of facility; and
upon recognizing that assistance, in response to the request, by an owner of at least one terminal apparatus scheduled to be situated in a predetermined area with respect to the specific type of facility at the expected arrival time is available at the section that passes through the specific type of facility, allow use of the section that passes through the specific type of facility in generation of the section of the route to be traveled by the wheelchair.

2. The information processing apparatus according to claim 1, wherein
the controller is configured to:
notify an announcement apparatus of an expected arrival time for a location at which the announcement apparatus exists based on a location of a requestor of the search for the route and a time at which the requestor is at the location, and
the announcement apparatus is situated in the section of the route to be traveled by the wheelchair,
the announcement apparatus installed in a facility of which people in need of assistance are given priority use, and
the announcement apparatus is configured to announce a presence of a person in need of assistance to one or more users of the facility.

3. An information processing system comprising:
the information processing apparatus according to claim 2; and
the announcement apparatus.

4. The information processing apparatus according to claim 1, wherein
when a current location of a requestor of the search for the route is within a predetermined range from the specific type of facility, the controller is configured to send an approach notification indicating that the requestor is approaching.

5. The information processing apparatus according to claim 4, wherein
when travel assistance has been performed, the controller is configured to give a point to a helper who performed the travel assistance.

6. An information processing system comprising:
the information processing apparatus according to claim 1; and
the at least one terminal apparatus.

7. The information processing apparatus according to claim 1, wherein
the controller is configured to:
send the request to a second information processing apparatus; and
recognize that the assistance by the owner of the at least one terminal apparatus is available at the section that passes through the specific type of facility, upon acquiring a notification that the request has been sent by the second information processing apparatus to a number of terminal apparatuses exceeding a threshold, the terminal apparatuses being scheduled to be situated in the predetermined area with respect to the specific type of facility at the expected arrival time.

8. The information processing apparatus according to claim 1, wherein
the controller is configured to recognize that the assistance by the owner of the at least one terminal apparatus is available at the section that passes through the specific type of facility, upon finding a number of terminal apparatuses exceeding a threshold in search for terminal apparatuses scheduled to be situated in the predetermined area with respect to the specific type of facility at the expected arrival time.

9. A non-transitory computer-readable storage medium storing a program which, when executed, causes an information processing apparatus to execute a process, the process comprising:
upon recognizing a request for a search for a route between two locations, generating, using a link and a node at which travel by a wheelchair is possible, a section of the route to be traveled by the wheelchair;
sending a request for assistance at a section that passes through a specific type of facility included in the section of the route to be traveled by the wheelchair, the request including an expected arrival time for the specific type of facility; and
upon recognizing that assistance, in response to the request, by an owner of at least one terminal apparatus scheduled to be situated in a predetermined area with respect to the specific type of facility at the expected arrival time is available at the section that passes through the specific type of facility, allowing use of the section that passes through the specific type of facility in generation of the section of the route to be traveled by the wheelchair.

10. The non-transitory computer-readable storage medium according to claim 9, wherein the process further comprises:
notifying an announcement apparatus of an expected arrival time for a location at which the announcement apparatus exists based on a location of a requestor of the search for the route and a time at which the requestor is at the location, wherein
the announcement apparatus is situated in the section of the route to be traveled by the wheelchair,
the announcement apparatus is installed in a facility of which people in need of assistance are given priority use, and
the announcement apparatus is configured to announce a presence of a person in need of assistance to one or more users of the facility.

11. The non-transitory computer-readable storage medium according to claim 9, wherein the process further comprises:
when a current location of a requestor of the search for the route is within a predetermined range from the specific type of facility, sending an approach notification indicating that the requestor is approaching.

12. The non-transitory computer-readable storage medium according to claim 11, wherein the process further comprises:
when travel assistance has been performed, giving a point to a helper who performed the travel assistance.

13. The non-transitory computer-readable storage medium according to claim 9, wherein the process further comprises:
sending the request to a second information processing apparatus; and
recognizing that the assistance by the owner of the at least one terminal apparatus is available at the section that passes through the specific type of facility, upon acquiring a notification that the request has been sent by the second information processing apparatus to a number of terminal apparatuses exceeding a threshold, the terminal apparatuses being scheduled to be situated in the predetermined area with respect to the specific type of facility at the expected arrival time.

14. The non-transitory computer-readable storage medium according to claim 9, wherein the process further comprises:
recognizing that the assistance by the owner of the at least one terminal apparatus is available at the section that passes through the specific type of facility, upon finding a number of terminal apparatuses exceeding a threshold in search for terminal apparatuses scheduled to be situated in the predetermined area with respect to the specific type of facility at the expected arrival time.

15. An information processing method implemented by an information processing apparatus, the information processing method comprising:
upon recognizing a request for a search for a route between two locations, generating, using a link and a node at which travel by a wheelchair is possible, a section of the route to be traveled by the wheelchair;
sending a request for assistance at a section that passes through a specific type of facility included in the section of the route to be traveled by the wheelchair, the request including an expected arrival time for the specific type of facility; and
upon recognizing that assistance, in response to the request, by an owner of at least one terminal apparatus scheduled to be situated in a predetermined area with respect to the specific type of facility at the expected arrival time is available at the section that passes through the specific type of facility, allowing use of the section that passes through the specific type of facility in generation of the section of the route to be traveled by the wheelchair.

16. The information processing method according to claim 15, further comprising:
notifying an announcement apparatus of an expected arrival time for a location at which the announcement apparatus exists based on a location of a requestor of the search for the route and a time at which the requestor is at the location, wherein
the announcement apparatus is situated in the section of the route to be traveled by the wheelchair,
the announcement apparatus is installed in a facility of which people in need of assistance are given priority use, and
the announcement apparatus is configured to announce a presence of a person in need of assistance to one or more users of the facility.

17. The information processing method according to claim 15, further comprising:
when a current location of a requestor of the search for the route is within a predetermined range from the specific type of facility, sending an approach notification indicating that the requestor is approaching.

18. The information processing method according to claim 17, further comprising:
when travel assistance has been performed, giving a point to a helper who performed the travel assistance.

19. The information processing method according to claim 15, further comprising:
- sending the request to a second information processing apparatus; and
- recognizing that the assistance by the owner of the at least one terminal apparatus is available at the section that passes through the specific type of facility, upon acquiring a notification that the request has been sent by the second information processing apparatus to a number of terminal apparatuses exceeding a threshold, the terminal apparatuses being scheduled to be situated in the predetermined area with respect to the specific type of facility at the expected arrival time.

20. The information processing method according to claim 15, further comprising:
- recognizing that the assistance by the owner of the at least one terminal apparatus is available at the section that passes through the specific type of facility, upon finding a number of terminal apparatuses exceeding a threshold in search for terminal apparatuses scheduled to be situated in the predetermined area with respect to the specific type of facility at the expected arrival time.

\* \* \* \* \*